US011994041B2

(12) United States Patent
Johnson et al.

(10) Patent No.: US 11,994,041 B2
(45) Date of Patent: May 28, 2024

(54) ADVANCED AERO DIFFUSERS FOR TURBINE FRAMES AND OUTLET GUIDE VANES

(71) Applicant: General Electric Company, Schenectady, NY (US)

(72) Inventors: Christopher R. Johnson, Fairfield, OH (US); Thomas J. Lipinski, Monroe, OH (US); Eric Schroeder, Loveland, OH (US); Carlos Fernandez, Hamilton, OH (US); David A. Perveiler, West Chester, OH (US)

(73) Assignee: General Electric Company, Schenectady, NY (US)

( * ) Notice: Subject to any disclaimer, the term of this patent is extended or adjusted under 35 U.S.C. 154(b) by 39 days.

(21) Appl. No.: 17/493,318

(22) Filed: Oct. 4, 2021

(65) Prior Publication Data

US 2023/0105213 A1 Apr. 6, 2023

(51) Int. Cl.
*F01D 9/04* (2006.01)
*F01D 5/14* (2006.01)
*F01D 5/22* (2006.01)
*F01D 25/28* (2006.01)

(52) U.S. Cl.
CPC ............... *F01D 9/041* (2013.01); *F01D 5/22* (2013.01); *F01D 25/28* (2013.01); *F01D 5/145* (2013.01); *F05D 2240/12* (2013.01)

(58) Field of Classification Search
CPC ... F01D 9/02; F01D 9/04; F01D 9/041; F01D 9/042; F01D 5/145; F01D 5/22; F01D 25/28; F05D 2240/12; F05D 2240/126; F04D 29/54; F04D 29/541; F04D 29/542
See application file for complete search history.

(56) References Cited

U.S. PATENT DOCUMENTS

| 3,006,603 | A | 10/1961 | Caruso et al. |
| 3,902,314 | A | 9/1975 | Straniti |
| 8,708,639 | B2 | 4/2014 | Subramaniyan |
| 9,567,970 | B2 | 1/2017 | Wood |
| 10,233,779 | B2 | 2/2019 | Wilkins et al. |
| 2005/0081530 | A1* | 4/2005 | Bagnall ................. F01D 9/065 60/785 |
| 2007/0012046 | A1* | 1/2007 | Larsson ................. F01D 9/02 60/791 |
| 2007/0134089 | A1* | 6/2007 | Lee ..................... F01D 9/041 415/209.2 |

(Continued)

FOREIGN PATENT DOCUMENTS

| CN | 102052090 | 5/2011 |
| DE | 102012215413 | 3/2014 |

*Primary Examiner* — Elton K Wong
(74) *Attorney, Agent, or Firm* — Hanley, Flight & Zimmerman, LLC

(57) ABSTRACT

Diffuser apparatus for turbine frames and outlet guide vanes are disclosed. An example diffuser is integrated into a turbine engine. The example diffuser includes a plurality of struts extending between an inner portion and an outer portion of the turbine engine; and a plurality of flowpath surfaces supported by the plurality of struts. The example plurality of flowpath surfaces extends circumferentially within the turbine engine at a plurality of radial spans to control diffusion of air flow within the turbine engine.

15 Claims, 8 Drawing Sheets

(56) References Cited

U.S. PATENT DOCUMENTS

| | | | |
|---|---|---|---|
| 2011/0000223 A1* | 1/2011 | Russberg | F01D 9/041 29/889.2 |
| 2012/0027617 A1* | 2/2012 | Garza | F01D 9/04 29/889.1 |
| 2012/0087775 A1 | 4/2012 | Subramaniyan | |
| 2014/0044535 A1 | 2/2014 | Wood | |
| 2014/0127013 A1* | 5/2014 | Spangler | F01D 5/18 416/97 R |
| 2016/0245119 A1 | 8/2016 | Wilkins et al. | |
| 2017/0022901 A1 | 1/2017 | Orosa | |
| 2017/0184053 A1* | 6/2017 | Harvey | F02K 1/82 |
| 2017/0211399 A1 | 7/2017 | Khan et al. | |
| 2019/0003325 A1* | 1/2019 | Kuchana | F01D 9/06 |
| 2019/0071980 A1* | 3/2019 | Spangler | F01D 5/187 |
| 2019/0338785 A1 | 11/2019 | Sommer et al. | |

* cited by examiner

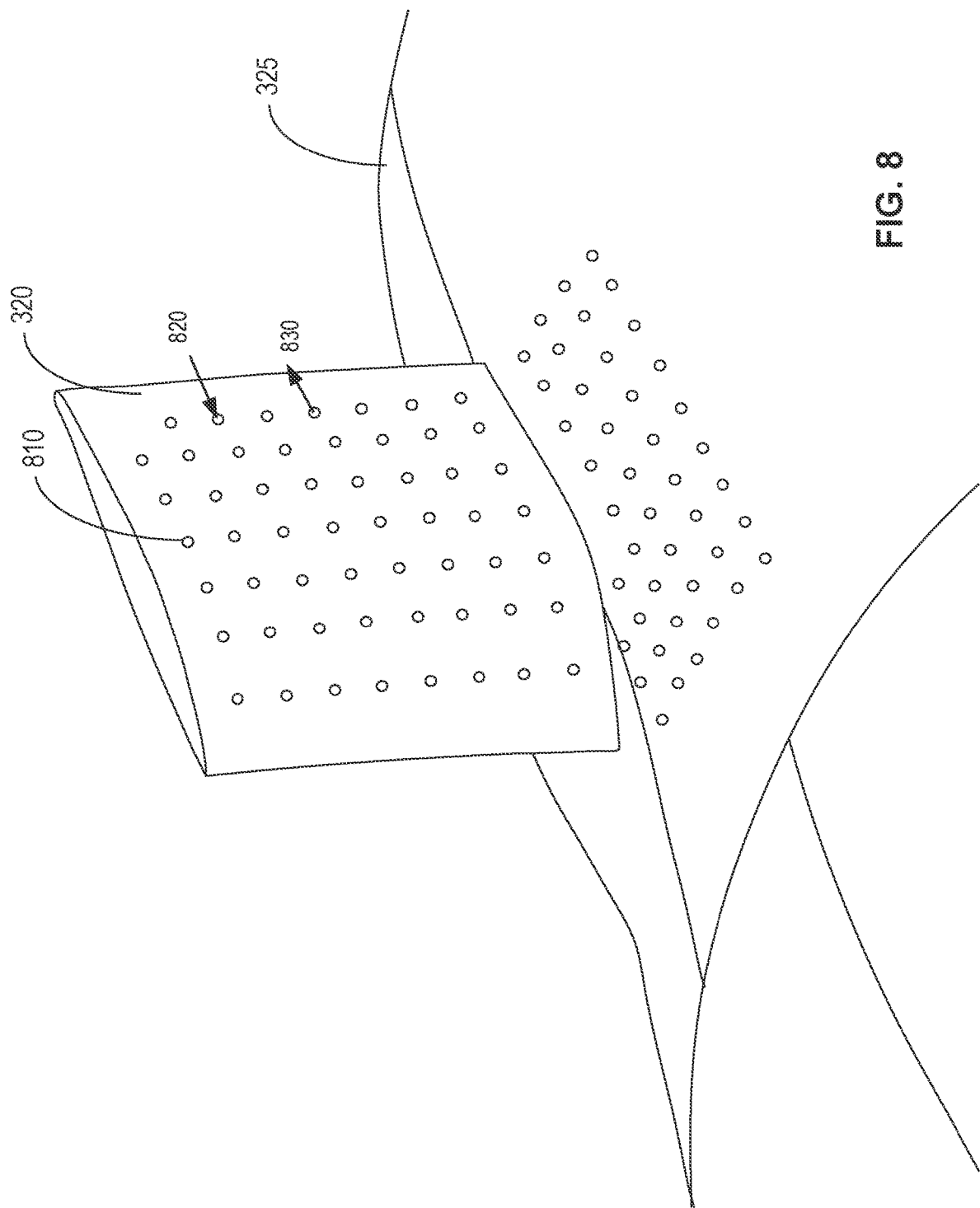

ADVANCED AERO DIFFUSERS FOR TURBINE FRAMES AND OUTLET GUIDE VANES

STATEMENT REGARDING FEDERALLY SPONSORED RESEARCH OR DEVELOPMENT

This invention was made with United States Government support. The United States Government may have certain rights in the invention.

FIELD OF THE DISCLOSURE

This disclosure relates generally to turbine engines and, more particularly, to diffusers for turbine frames and outlet guide vanes.

BACKGROUND

Turbine engines are some of the most widely-used power generating technologies. Gas turbines are an example of an internal combustion engine that uses a burning air-fuel mixture to produce hot gases that spin the turbine, thereby generating power. Application of gas turbines can be found in aircraft, trains, ships, electrical generators, gas compressors, and pumps. For example, modern aircraft rely on a variety of gas turbine engines as part of a propulsion system to generate thrust, including a turbojet, a turbofan, a turboprop, and an afterburning turbojet. Such engines include a combustion section, a compressor section, a turbine section, and an inlet, providing high power output with a high thermal efficiency.

Turbine engines can include a diffuser section, which can slow down air delivered by the compressor section to the combustion section to reduce air flow loss in the combustion section. Slower air flow and higher static pressure created by the diffuser section helps to stabilize the combustion section and improve combustion efficiency. However, limitations in the design and positioning of the diffuser section limit its effectiveness in reducing air flow and improving combustion stabilization and efficiency.

BRIEF DESCRIPTION OF THE DRAWINGS

FIGS. 3-8 illustrate example views of diffusers that can be formed in various sections of the example gas turbine engine of FIG. 1.

DETAILED DESCRIPTION

Figure 1:
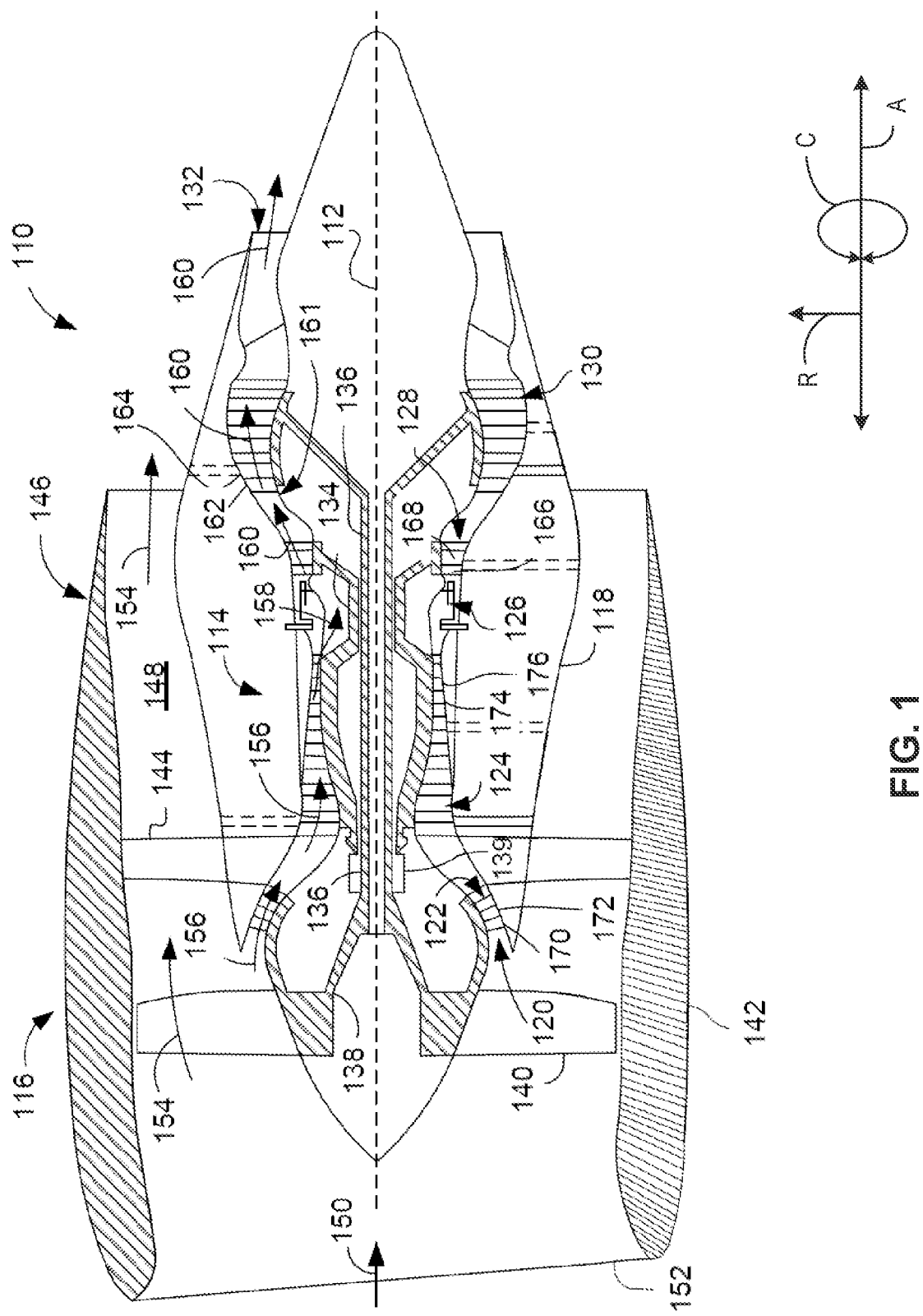
FIG. 1 is a schematic cross-sectional view of an example turbine engine.

Certain examples implement an improved flow diffuser that can be positioned at a plurality of locations through a turbine engine or other axial flow turbomachine (e.g., a turbine center, a turbine rear frame, an outlet guide vane, an exhaust center body, etc.) to guide airflow through a respective portion of the engine. One or more flowpath surfaces can be supported by struts and/or other airfoil shapes to rigidly place the flowpath surface(s) at one or more defined locations through the engine. Each of the flowpath surface(s) locally controls flow diffusion rates and enable more aggressive diffusion to occur in a reduced axial length compared to prior diffuser designs, which required longer lengths in a diffuser section to control air flow. Additionally, the flowpath surfaces can be utilized as enablers of fluidic boundary control and/or boundary layer suction to further enhance diffusion and mitigate boundary layer growth, separation, and associated pressure losses and recirculation zones.

In the exhaust section of aircraft engines, air flow is often diffused through turbine rear frames, outlet guide vanes, and/or exhaust center bodies. This diffusion is executed with aerodynamic care as large pressure losses may be generated if wall boundary layers are rapidly grown and tripped, causing a transition from laminar to turbulent or separated flow and associated pressure losses. Furthermore, flow separation in augmented engines may result in local recirculation zones that intern or temporarily retain fuel that may subsequently ignite to cause damage resulting in decrease in viable part life or catastrophic failure in the engine.

Prior diffusion designs are accomplished through flow area increases at empirical lengths with associated diffusion rates. However, the diffusion rate, often corresponding to a flow area rate of increase, is limited to ensure that "clean" diffusion occurs with no separation. This diffusion limitation ultimately increases the overall length at which diffusion occurs, which results in a lengthening of the overall engine to accommodate the longer diffusion section. Certain examples address these deficiencies by enabling more rapid diffusion at lower pressure losses, resulting in reduced engine length.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with reference to the axial direction, radial direction, and circumferential direction of the vehicle associated with the features, forces and moments. In general, the attached figures are annotated with a set of axes including the axial axis A, the radial axis R, and the circumferential axis C.

In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.). As used herein, an object is substantially specifically if the object has a radius that vary within 15% of the average radius of the object.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

As used herein, the terms "system," "unit," "module,", "engine,", "component," etc., may include a hardware and/or software system that operates to perform one or more functions. For example, a module, unit, or system may include a computer processor, controller, and/or other logic-based device that performs operations based on instructions stored on a tangible and non-transitory computer readable storage medium, such as a computer memory. Alternatively, a module, unit, or system may include a hard-wires device that performs operations based on hard-wired logic of the device. Various modules, units, engines, and/or systems shown in the attached figures may represent the hardware that operates based on software or hardwired instructions, the software that directs hardware to perform the operations, or a combination thereof.

A turbine engine, also called a combustion turbine or a gas turbine, is a type of internal combustion engine. Turbine engines are commonly utilized in aircraft and power-generation applications. As used herein, the terms "asset," "aircraft turbine engine," "gas turbine," "land-based turbine engine," and "turbine engine" are used interchangeably. A basic operation of the turbine engine includes an intake of fresh atmospheric air flow through the front of the turbine engine with a fan. In some examples, the air flow travels through an intermediate-pressure compressor or a booster compressor located between the fan and a high-pressure compressor. The booster compressor is used to supercharge or boost the pressure of the air flow prior to the air flow entering the high-pressure compressor. The air flow can then travel through the high-pressure compressor that further pressurizes the air flow. The high-pressure compressor includes a group of blades attached to a shaft. The blades spin at high speed and subsequently compress the air flow. The high-pressure compressor then feeds the pressurized air flow to a combustion chamber. In some examples, the high-pressure compressor feeds the pressurized air flow at speeds of hundreds of miles per hour. In some instances, the combustion chamber includes one or more rings of fuel injectors that inject a steady stream of fuel into the combustion chamber, where the fuel mixes with the pressurized air flow.

In the combustion chamber of the turbine engine, the fuel is ignited with an electric spark provided by an igniter, where the fuel in some examples burns at temperatures of more than 1,000 degrees Celsius. The resulting combustion produces a high-temperature, high-pressure gas stream (e.g., hot combustion gas) that passes through another group of blades of a turbine. The turbine includes an intricate array of alternating rotating and stationary airfoil-section blades. As the hot combustion gas passes through the turbine, the hot combustion gas expands, causing the rotating blades to spin. The rotating blades serve at least two purposes. A first purpose of the rotating blades is to drive the booster compressor and/or the high-pressure compressor to draw more pressured air into the combustion chamber. For example, the turbine is attached to the same shaft as the high-pressure compressor in a direct-drive configuration, thus, the spinning of the turbine causes the high-pressure compressor to spin. A second purpose of the rotating blades is to spin a generator operatively coupled to the turbine section to produce electricity, and/or to drive a rotor, fan or propeller. For example, the turbine can generate electricity to be used by an aircraft, a power station, etc. In the example of an aircraft turbine engine, after passing through the turbine, the hot combustion gas exits the aircraft turbine engine through a nozzle at the back of the aircraft turbine engine.

Referring now to the drawings, wherein identical numerals indicate the same elements throughout the figures, FIG. 1 is a schematic cross-sectional view of an example high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 112, the radial direction R is a direction that extends orthogonally outwardly from the centerline axis 112, and the circumferential direction C is a direction that extends concentrically around the centerline axis 112.

In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low pressure compressor 122 ("LP compressor 122") and a high pressure compressor 124 ("HP compressor 124"), a combustion section 126, a turbine section having a high pressure turbine 128 ("HP turbine 128") and a low pressure turbine 130 ("LP turbine 130"), and an exhaust section 132. A high pressure shaft or spool 134 ("HP shaft 134") drivingly couples the HP turbine 128 and the HP compressor 124. A low pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gearbox 139) can be included between any shafts and spools. For example, the reduction gearbox 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130. The flow of air can be hot, which can result in deflection and decrease in aerodynamic performance.

Certain examples provide a flow diffuser positioned with respect to one or more turbine frames such as the example turbine frame 161 and/or other turbine center frame, turbine rear frame, outlet guide vane, exhaust center body, etc. The example diffuser can diffuse or spread out air flow from the turbine frame, resulting in a plurality of smaller air flows, rather than a single larger air flow, which can mitigate an effect of the air flow on downstream portions of the turbine engine, which requires a high pressure, low velocity airflow to reduce the likelihood of flame-outs, to facilitate a stable and consistent burn, and to achieve an overall improved combustion process. For example, the air flow enters the diffuser along an axial direction from the respective turbine frame, is diffused, and continues along an axis or centerline through the engine. The structure of the example diffuser helps to alleviate stress caused by heated air and reduces the air's velocity, while increasing air pressure, as the air passes through the diffuser and on through the engine.

Figure 2:
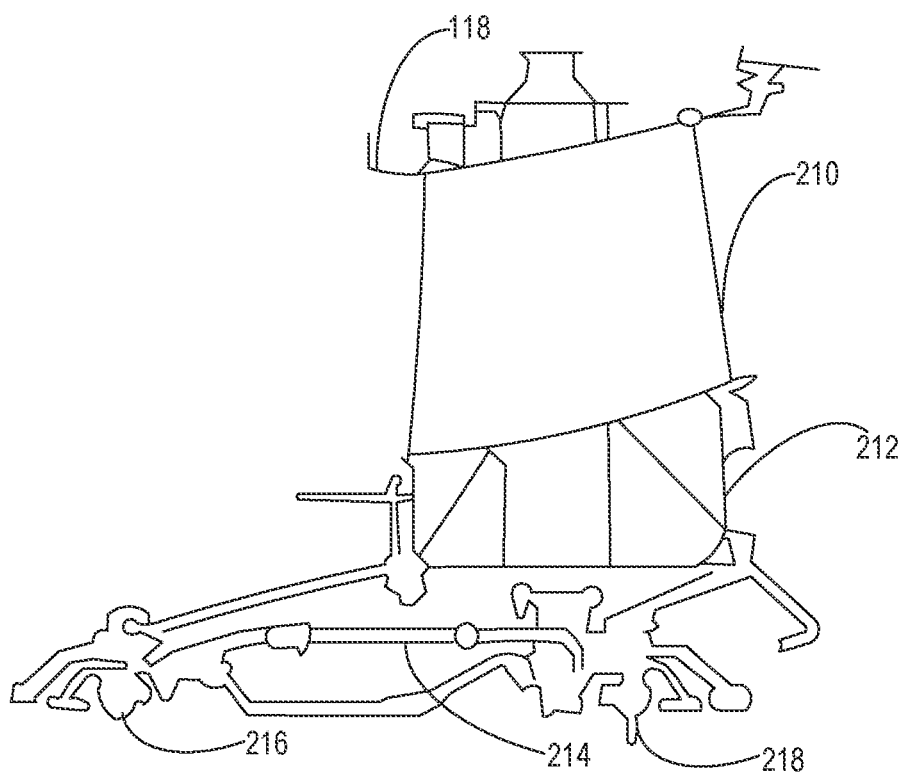
FIG. 2 illustrates a prior strut configuration for airflow that can be utilized within the example gas turbine engine of FIG. 1.

FIG. 2 illustrates a prior configuration 200 in which a strut 210 is connected to the outer casing 118 and to an inner hub 212, which is connected to a shaft 214 have a first bearing 216 and a second bearing 218. Air flow passes through the strut 210-hub 212 structure but can be subject to pressure loss from rapid growth and trip in wall boundary layers.

A boundary layer is a layer of a fluid, such as air, in the vicinity of a bounding surface (e.g., the strut 210, the hub 212, etc.) where the fluid experiences significant effects of viscosity. As such, viscous forces distort surrounding non-viscous air flow. A rapid growth and tripping of the wall boundary layer can cause a transition from laminar air flow to turbulent or separated air flow and associated pressure loss (e.g., the boundary layer changes from a smooth, consistent flow to an uneven, irregular flow). Further, flow separation and turbulence can result in formation of local recirculation zones that can retain fuel, which can subsequently ignite. Ignited fuel can result in catastrophic failure or at least decrease in viable engine part life.

To combat such risk of damage or failure from tripping of the boundary layer, a length of an air flow area can be increased, but such an increased length increases a length of the overall engine 110. Rather than increasing engine length, certain examples described herein provide improved diffuser technology to enable more rapid diffusion at lower pressure losses, resulting in reduced engine length while providing improved efficiency and stability, for example. Certain examples improve diffuser technology using a multi-layered configuration including a plurality of flowpath surfaces (and supporting elements to increase diffusion and affect air flow and boundary layer conditions at lower pressure. The flowpath surfaces enable local flow to stay attached to available surfaces while maintaining a rate of deceleration of the velocity flow. Positioning of the multiple flowpath surfaces in one or more sections of the engine has a technical effect of providing a desired rate of diffusion at a shorter engine length than possible in a traditional engine diffuser structure.

In certain examples, the flow diffuser includes one or more flowpath surfaces supported by struts and/or airfoil shapes to rigidly place the flowpath surfaces at defined locations. The flowpath surfaces locally control flow diffusion rates and enable more aggressive diffusion to occur in a reduced axial length. Additionally, the flowpath surfaces of the diffuser can enable fluidic boundary control and/or boundary layer suction to further enhance diffusion and mitigate boundary layer growth and separation and associated pressure losses and recirculation zones, for example. Using such a diffuser enhances the engine's ability to aggressively diffuse air flow, which reduces an engine exhaust module and correspondingly reduces engine length. A reduction in engine length leads to a reduced engine weight and a reduced aircraft system weight. Additionally, the flow diffuser design provides increased aerodynamic performance relative to other diffusion rate designs.

As such, certain examples provide control of air flow diffusion in a turbine rear frame, outlet guide vanes, and/or exhaust center bodies through a unique multi-passage diffuser. Flowpath structures in the diffuser enhance local turning of air flow. Flowpath surfaces can incorporate boundary layer control technology to control areas of the diffuser which cause friction and slow air flow. For example, if the boundary layer separates from the flowpath surfaces, then the ability of the diffuser to slow air flow is reduced or eliminated in such sections. Removal of the boundary layer (e.g., through air hole or apertures in certain flowpath structures, etc.) helps to ensure proper air flow through the diffuser to allow the flowpath surfaces to slow the air flow without tripping the boundary layer, for example.

Figure 3:
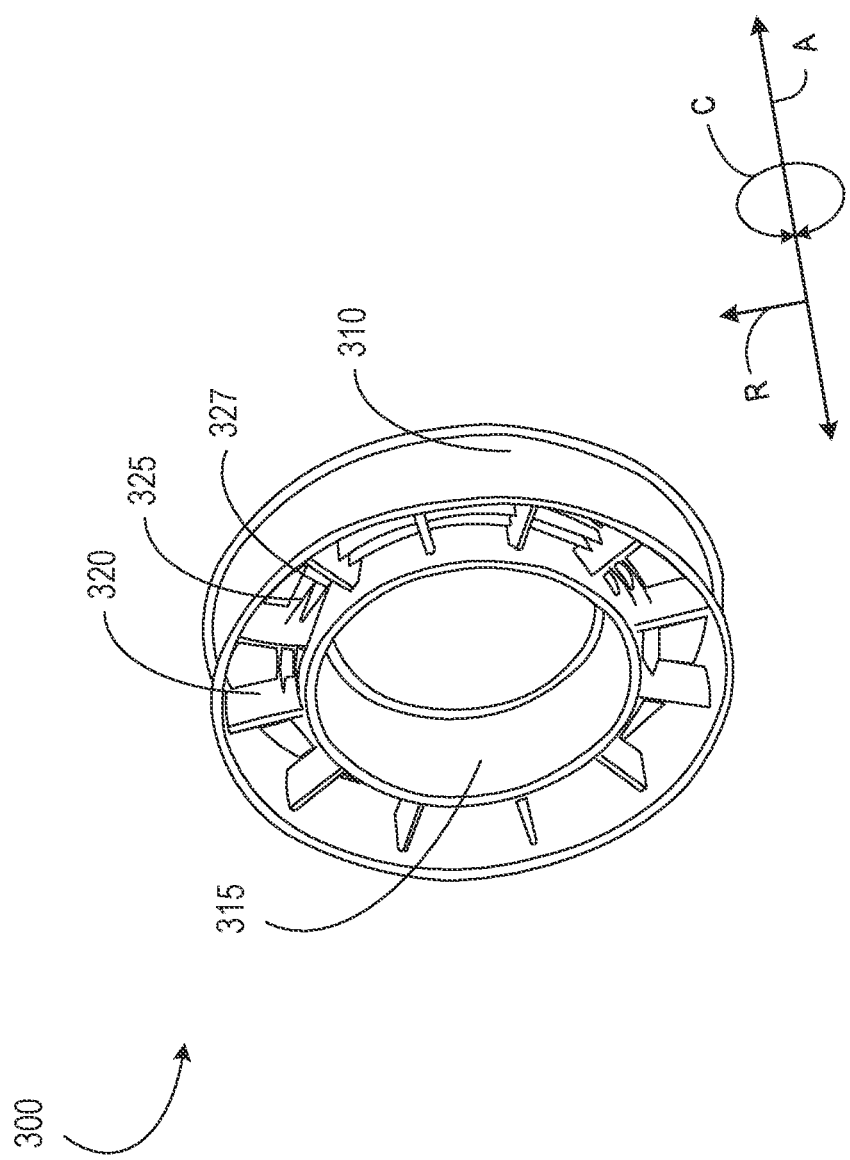

FIG. 3 illustrates an example multi-passage diffuser 300 formed from an outer turbine frame 310 and an inner turbine frame 315 and including struts or airfoils 320 and a plurality of example flowpath surfaces 325, 327 positioned between the struts/airfoils 320. While the example of FIG. 3 is illustrated using a turbine frame formed of the outer turbine frame 310 and the inner turbine frame 315, it is understood that the multi-passage diffuser 300 can be implemented in a variety of engine components and/or positions (e.g., turbine center frame, turbine rear frame, exhaust center body, outlet guide vane, etc.). The example flowpath surfaces 325, 327 are arranged to disrupt or diffuse airflow passing between the outer turbine frame 310 and the inner turbine frame 315 through the diffuser 300.

As shown in the example of FIG. 3, the flowpath surfaces 325, 327 extend radially (e.g., in the R direction depicted in FIG. 3) between inner turbine frame 315 and the outer turbine frame 310 along a flow path in an axial direction (e.g., in the A direction depicted in FIG. 3). The flowpath surfaces 325, 327 extend circumferentially (e.g., in the C direction depicted in FIG. 3) between the struts or airfoils 320 extending from the inner turbine frame 315 to the outer turbine frame 310 and supporting the flowpath surfaces 325-327. Different arrangements of the flowpath surfaces 325, 327 provide different changes to airflow (e.g., illustrated generally by an arrow 410 in the example of FIG. 4) through the section of the diffuser 300 (here formed from inner 315 and outer 310 portions of the turbine frame). While a plurality of flowpath surfaces 325, 327 are shown in the example of FIG. 3, other examples can include fewer or more flowpath surfaces than the example flowpath surfaces 325, 327 (and struts 320) depicted in FIG. 3.

The example flowpath surfaces 325, 327 are positioned with respect to the outer 310 and inner 315 turbine frame supported by the struts 320 to control air flow diffusion by creating localized flow deceleration based on position of the flowpath surface 325, 327 and associated strut(s) 320. Such localized control of flow deceleration enables more rapid flow diffusion. Flowpath surfaces can similarly be placed at radial spans in a turbine center frame, turbine rear frame, outlet guide vane, and/or exhaust center body to locally control flow deceleration and enable more rapid flow diffusion in those areas of the engine. Positioning and/or shape of the flowpath surfaces 325, 327 enables control of diffusion parameters such as flow splits, flow areas, and diffusion length.

That is, the shape, distance, other positioning, etc., of the flowpath surfaces 325, 327 with respect to the struts 320, outer turbine frame 310, and inner turbine frame 315 corresponds to or sets a value for various diffusion parameters such as flow split, flow area, and diffusion length. For example, a length, curvature, thickness, spacing, material, and/or other characteristic of each flowpath surface 325, 327 (and/or each strut 320) results in a certain value or diffusion parameter characteristic.

A multi-passage diffusion configuration, such as the arrangement of the example diffuser 300 of FIG. 3, provides improved diffusion and diffusion control for turbine center and rear frames and outlet guide vanes, for example. Additionally, the flowpath surfaces 325, 327 can be supported by stationary features such as symmetric and shaped airfoils or other struts 320 to enable local turning to meet required downstream profiles. These stationary features 320 can also internally pass air for wake fill-in, fluidic boundary layer control, etc. The stationary features (e.g., airfoils, struts, etc.) 320 can also include internal holes or piping to generate boundary layer suction from the multi-passage diffuser section 300.

By placing flowpath surfaces or panels 325-327 at various radial spans in the diffuser 300, the part-span panels 325-327 act to guide diffusion and locally energize air flow. Locally energized air flow enables more aggressive diffusion while reducing diffuser length. Furthermore, an inner flowpath of the multi-passage diffuser section 300 can be more aggressively radially lowered to blend into an exhaust center body (not shown) at a shorter axial length, for example. Additionally, turning airfoils/struts can be inserted between the flowpath surfaces 325-327 to support the flowpath surfaces 325-327 and to provide circumferential turning of the flow to condition the air flow prior to entering the exhaust section of the engine, for example. Furthermore, secondary flow may be passed through the supporting airfoils/struts 320 to provide cooling flow or purge flow, trailing edge wake fill-in, and/or active fluidic control of boundary layers by injecting energetic flow into the low-momentum boundary layer, thus delaying flow separation, for example.

Figure 4:
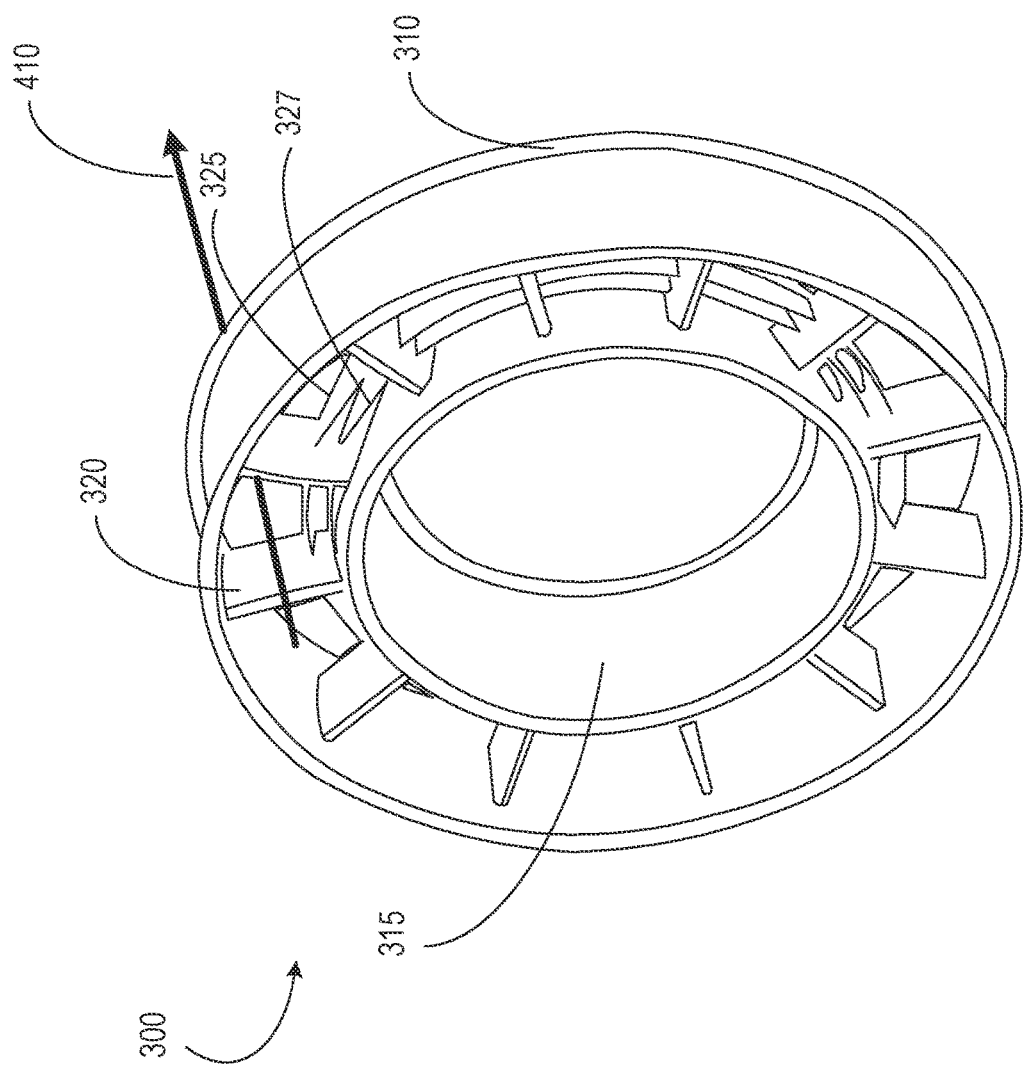
Figure 5:
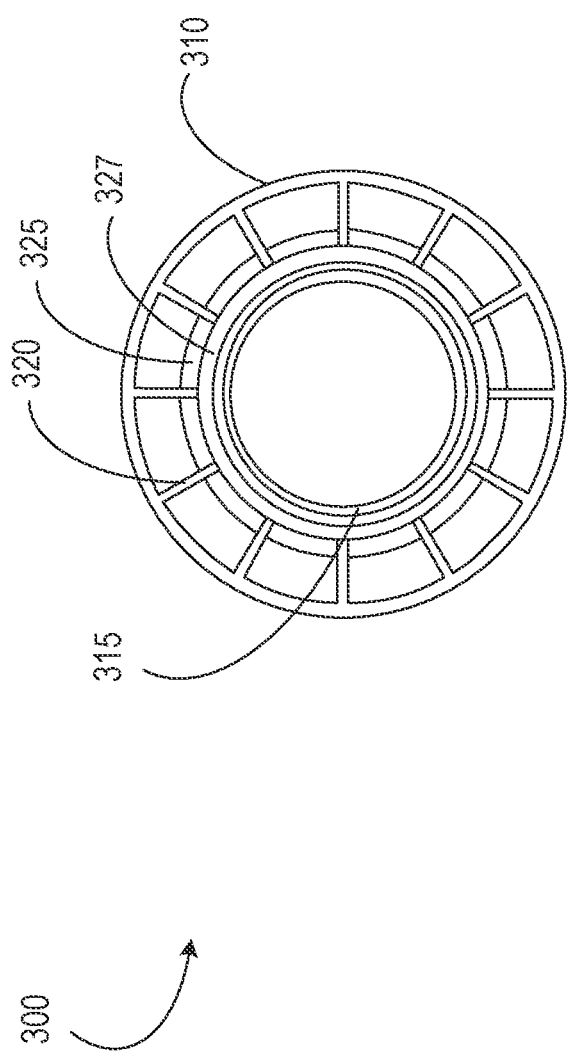
Figure 6:
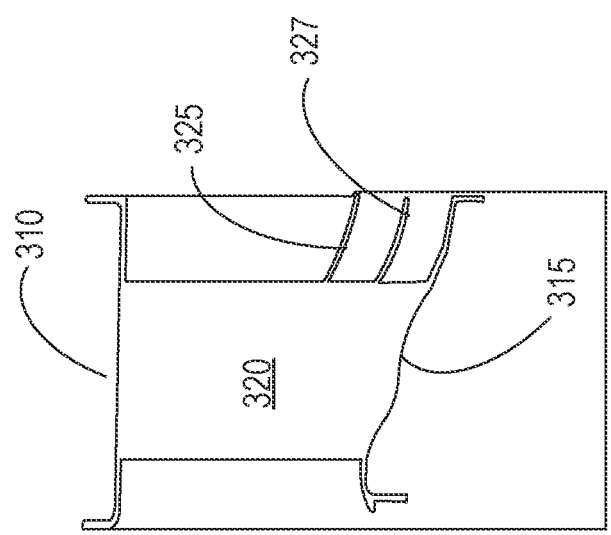

FIG. 4 illustrates an example airflow 410 through the example diffuser 300 formed of the outer turbine frame 310 and inner turbine frame 315. FIG. 5 illustrates a front view of the example diffuser 300 section to further depict an example arrangement of the flowpath surfaces 325, 327 with respect to the struts 320 between the inner turbine frame 315 and the outer turbine frame 310. FIG. 6 further illustrates a cross-section of an example radial strut 320 positioned between the inner turbine frame 315 and the outer turbine frame 310 with the flowpath surfaces 325-327 positioned circumferentially with respect to the example radial strut 320 between the inner 315 and outer 310 portions of the multi-passage diffuser 300.

Figure 7:
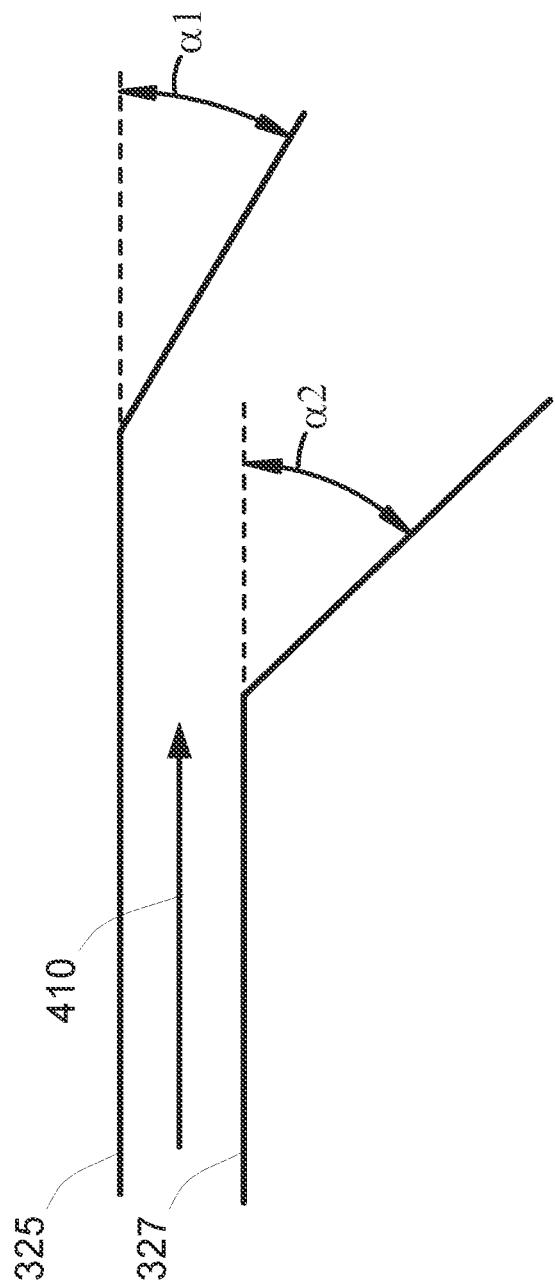

FIG. 7 illustrates another view of example flowpath surfaces 325, 327. The example flowpath surfaces 325, 327 begin parallel to each other and then diffuse air flow at varying angles, α1 and α2, for example. In the example of FIG. 7, the angle α1 is +/−30 degrees from a free stream flowpath, and α2 has a greater varying angle corresponding to an amount or extent of diffusion assistance provided by the passage formed by the respective flowpath surface 325, 327 (e.g., +/−45 degrees, etc.). A height of the passage can be controlled by the associated flowpath surface(s) 325, 327 as diffuser guides. The flowpath surface(s) 325, 327 can be placed at a certain passage height as a function of a rate of local diffusion, boundary layer strength, broad area diffusion, and/or general flow properties (e.g., velocity, pressure gradient, etc.), for example. The more aggressive the diffusion (e.g., more flow control needed), the lower the surface 325, 327 is positioned in the passage height. A range of passage height can vary from negligible to 33% of total free stream passage height, for example. If the air flow involves substantial control for diffusion, the guide surface(s) 325, 327 can be lowered and/or additional guides placed in radial sections outward from the passage walls, for example. These values are provided for the purpose of example illustration only and can vary depending on a desired degree of diffusion and/or other structural limiting factors, for example.

As noted above, presence of and consistency in a boundary layer impacts an ability of the diffuser 300 to control air flow. A boundary layer can form on one or more of the flowpath surfaces 325-327 and/or associated airfoils, struts, etc., as the flow of air passes the surfaces. In certain examples, such as shown in FIG. 8, holes and/or other openings 810 can be inserted into and/or otherwise formed in one or more of the flowpath surfaces 325-327 and/or piped through associated airfoils/struts 320 (e.g., in areas or regions of high diffusion) such that a developing boundary layer of the diffusing section is suctioned 820 off the surface(s) 320-327. The suctioning or removal 820 of the boundary layer (e.g., a low momentum boundary layer) enables more aggressive diffusion to occur in the area of the holes 810. Cooling air and/or other air flow 830 can be provided through the holes 810 to reintroduce the boundary layer as an energized boundary layer that does not separate with hot gas at the surface, for example. As such, the boundary layer can be reduced to increase a speed of diffusion. Boundary layer air that is drawn away 820 through the holes 810 can be reintroduced 830 as cooling and/or other air flow through other holes 810 downstream to form a more stable, uniform boundary layer, for example.

From the foregoing, it will be appreciated that the disclosed apparatus enables improved air flow diffusion involving less space in a turbine engine. The introduction of additional flowpath surfaces in various parts of the engine (e.g., turbine rear frame, turbine center frame, exhaust center body, guide frame, etc.) enables improved diffusion without requiring a separate, dedicated diffusion section which extends the length and weight of the engine and affects its balance and stability. Such flowpath surfaces can be formed of a variety of high-temperature resistant materials such as metallic, ceramic, and/or other material that has a high heat tolerance and can form proper aerodynamic properties to diffuse the air flow. Multi-path diffusion in one or more areas of a turbine engine enables improved, more rapid diffusion while also providing a cooling benefit from colder air introduced to cool down hot surfaces in the engine.

Certain examples provide a multi-layered approach to outfit one or more sections of an engine with circumferential flowpath surfaces (and supporting elements, if applicable) to diffuse and/or otherwise affect air flow and boundary layer conditions in the engine. Such flowpath features enable local flow to stay attached to available surfaces while maintaining a rate of deceleration of the velocity flow. In certain examples, flowpath surfaces can additionally or alternatively be positioned as guide vanes to enable an axial turning of the air flow to align with an engine centerline, as well as swirl or deswirl the flow of air through the portion of the engine.

The presently described technology can be implemented according to a plurality of examples. In certain examples, the flowpath surfaces 325, 327 provide means for diffusing axial air flow spaced circumferentially and extending radially within a turbine engine. In certain examples, the strut 320 provides means for supporting the means for diffusing within the turbine engine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

Further aspects of the present disclosure are provided by the subject matter of the following clauses:

Diffuser apparatus for turbine frames and outlet guide vanes are disclosed.

Example 1 provides a turbine engine. The example turbine engine includes a plurality of struts arranged radially between an inner portion and an outer portion of the turbine engine; and a plurality of flowpath surfaces supported by the plurality of struts. The example plurality of flowpath surfaces extends radially between the inner portion and the outer portion of the turbine engine along a circumference of the inner portion and the outer portion of the turbine engine to control diffusion of air flow in an axial direction.

Example 2 provides the turbine engine of any preceding clause, wherein at least one of the plurality of struts or the plurality of flowpath surfaces includes openings to control a boundary layer adjacent the respective at least one of the plurality of struts or the plurality of flowpath surfaces.

Example 3 provides the turbine engine of any preceding clause, wherein the openings include first openings to provide suction of the boundary layer and second openings to pass cooling air.

Example 4 provides the turbine engine of any preceding clause, wherein at least one of the plurality of struts includes an airfoil.

Example 5 provides the turbine engine of any preceding clause, wherein the plurality of struts includes at least one symmetric airfoil and at least one shaped airfoil.

Example 6 provides the turbine engine of any preceding clause, wherein the inner portion and the outer portion of the turbine engine form at least one of a turbine center frame, a turbine rear frame, an outlet guide vane, or an exhaust center body.

Example 7 provides the turbine engine of any preceding clause, wherein the plurality of flowpath surfaces define one or more diffusion parameters for an area including the plurality of flowpath surfaces.

Example 8 provides the turbine engine of any preceding clause, wherein the one or more diffusion parameters include a flow split, a flow area, or a diffusion length.

Example 9 provides the turbine engine of any preceding clause, wherein the plurality of flowpath surfaces includes a first flowpath surface and a second flowpath surface, the first flowpath surface parallel to the second flowpath surface at a first end and diverging away from each other at an angle at a second end.

Example 10 provides a diffuser integrated into a turbine engine. The example diffuser includes a plurality of struts extending between an inner portion and an outer portion of the turbine engine; and a plurality of flowpath surfaces supported by the plurality of struts. The example plurality of flowpath surfaces extends circumferentially within the turbine engine at a plurality of radial spans to control diffusion of air flow within the turbine engine.

Example 11 provides the diffuser of any preceding clause, wherein at least one of the plurality of struts or the plurality of flowpath surfaces includes openings to control a boundary layer adjacent the respective at least one of the plurality of struts or the plurality of flowpath surfaces.

Example 12 provides the diffuser of any preceding clause, wherein the openings include first openings to provide suction of the boundary layer and second openings to pass cooling air.

Example 13 provides the diffuser of any preceding clause, wherein at least one of the plurality of struts is an airfoil.

Example 14 provides the diffuser of any preceding clause, wherein the diffuser is integrated into at least one of a turbine center frame, a turbine rear frame, an outlet guide vane, or an exhaust center body of the turbine engine.

Example 15 provides the diffuser of any preceding clause, wherein the plurality of flowpath surfaces define one or more diffusion parameters for an area including the plurality of flowpath surfaces.

Example 16 provides the diffuser of any preceding clause, wherein the one or more diffusion parameters include a flow split, a flow area, or a diffusion length.

Example 17 provides the diffuser of any preceding clause, wherein the plurality of flowpath surfaces includes a first flowpath surface and a second flowpath surface, the first flowpath surface parallel to the second flowpath surface at a first end and diverging away from each other at an angle at a second end.

Example 18 provides a diffuser apparatus. The example diffuser apparatus includes means for diffusing axial air flow spaced circumferentially and extending radially within a turbine engine. The example diffuser apparatus also includes means for supporting the means for diffusing within the turbine engine.

Example 19 provides the diffuser apparatus of any preceding clause, wherein at least one of the means for diffusing or the means for supporting includes openings to control a boundary layer adjacent the respective at least one of the means for diffusing or the means for supporting.

Example 20 provides the diffuser apparatus of any preceding clause, wherein the means for diffusing and the means for supporting are integrated into at least one of a turbine center frame, a turbine rear frame, an outlet guide vane, or an exhaust center body of the turbine engine.

What is claimed is:

1. A turbine engine comprising:
   a plurality of struts arranged radially between an inner portion and an outer portion of the turbine engine; and
   a plurality of flowpath surfaces supported by the plurality of struts, the plurality of flowpath surfaces extending radially between the inner portion and the outer portion of the turbine engine along a circumference of the inner portion and the outer portion of the turbine engine to control diffusion of air flow in an axial direction,
   wherein the plurality of flowpath surfaces includes a first flowpath surface and a second flowpath surface, the first flowpath surface parallel to the second flowpath surface at a first end and diverging away from each other at an angle at a second end.

2. The turbine engine of claim 1, wherein at least one of the plurality of struts or the plurality of flowpath surfaces includes openings to control a boundary layer adjacent the respective at least one of the plurality of struts or the plurality of flowpath surfaces.

3. The turbine engine of claim 2, wherein the openings include first openings to provide suction of the boundary layer and second openings to pass cooling air.

4. The turbine engine of claim 1, wherein at least one of the plurality of struts includes an airfoil.

5. The turbine engine of claim 4, wherein the plurality of struts includes at least one symmetric airfoil and at least one shaped airfoil.

6. The turbine engine of claim 1, wherein the inner portion and the outer portion of the turbine engine form at least one of a turbine center frame, a turbine rear frame, an outlet guide vane, or an exhaust center body.

7. The turbine engine of claim 1, wherein the plurality of flowpath surfaces define one or more diffusion parameters for an area including the plurality of flowpath surfaces.

8. The turbine engine of claim 7, wherein the one or more diffusion parameters include a flow split, a flow area, or a diffusion length.

9. A diffuser integrated into a turbine engine, the diffuser comprising:
- a plurality of struts extending between an inner portion and an outer portion of the turbine engine; and
- a plurality of flowpath surfaces supported by the plurality of struts, the plurality of flowpath surfaces extending circumferentially within the turbine engine at a plurality of radial spans to control diffusion of air flow within the turbine engine,
- wherein the plurality of flowpath surfaces includes a first flowpath surface and a second flowpath surface, the first flowpath surface parallel to the second flowpath surface at a first end and diverging away from each other at an angle at a second end.

10. The diffuser of claim 9, wherein at least one of the plurality of struts or the plurality of flowpath surfaces includes openings to control a boundary layer adjacent the respective at least one of the plurality of struts or the plurality of flowpath surfaces.

11. The diffuser of claim 10, wherein the openings include first openings to provide suction of the boundary layer and second openings to pass cooling air.

12. The diffuser of claim 9, wherein at least one of the plurality of struts is an airfoil.

13. The diffuser of claim 9, wherein the diffuser is integrated into at least one of a turbine center frame, a turbine rear frame, an outlet guide vane, or an exhaust center body of the turbine engine.

14. The diffuser of claim 9, wherein the plurality of flowpath surfaces define one or more diffusion parameters for an area including the plurality of flowpath surfaces.

15. The diffuser of claim 14, wherein the one or more diffusion parameters include a flow split, a flow area, or a diffusion length.

* * * * *